United States Patent Office 2,847,334
Patented Aug. 12, 1958

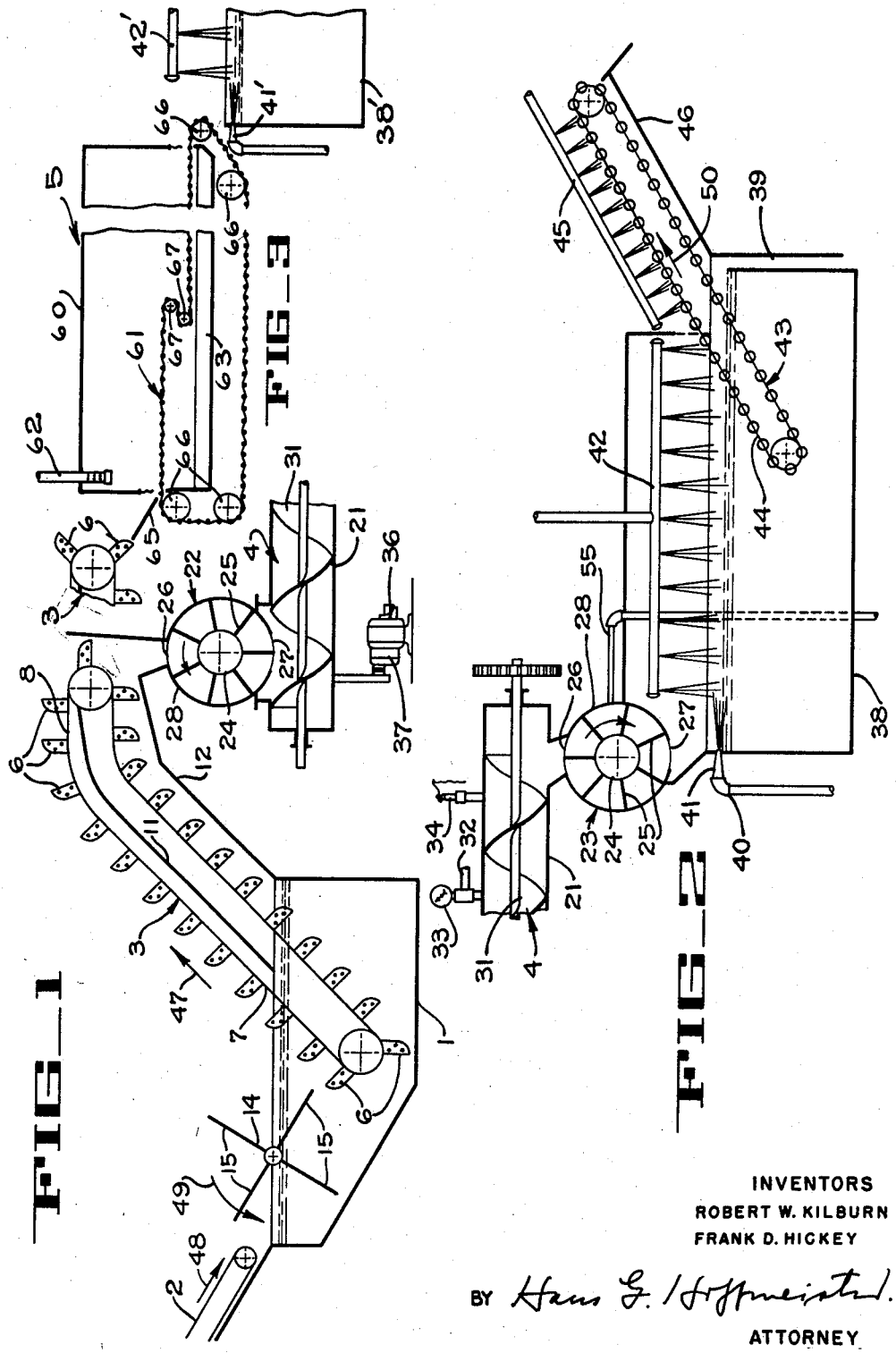

2,847,334

METHOD OF PEELING FRUIT AND VEGETABLES

Robert W. Kilburn, Lake Wales, Fla., and Frank D. Hickey, Mountain View, Calif., assignors to Food Machinery and Chemical Corporation, San Jose, Calif., a corporation of Delaware Original application January 17, 1952, Serial No. 266,882, now Patent No. 2,781,070, dated February 12, 1957. Divided and this application October 8, 1956, Serial No. 614,635

10 Claims. (Cl. 146—235)

The present invention relates to a method of peeling fruit or vegtables. This application is a division of our copending application entitled Apparatus for Peeling Fruit and Vegetables, Serial No. 266,882, filed January 17, 1952, now Patent No. 2,781,070, issued February 12, 1957; which application in turn is a continuation-in-part of our application entitled Method and Apparatus for Peeling Fruit and Vegetables, Serial No. 723,962, filed January 24, 1947, now abandoned.

In the art of lye peeling fruit or vegetables it has heretofore been the practice to immerse the products to be treated in a hot caustic solution of low concentration or to flood or spray the same therewith. However, this method requires a heat application to the skin of the fruit and vegetables for a considerable length of time so that a deep heat penetration into the products and, therefore, a partial cooking thereof is effected. This partial cooking of the treated products in the lye bath or spray causes changes in the tissues underlying the skin which for certain products make lye peeling undesirable and in other products make subsequent handling of the commodities difficult due to softening of the tissues under the skin. Furthermore, the excess alkali present during peeling of the fruit in the caustic bath or spray neutralizes the acids of the fruit and may produce an alkaline layer of tissue causing discoloration and changes in flavor of the treated commodities. This softening of the tissues causes in some products considerable loss of weight of the finished product due to sloughing off of the cooked portions thereof during washing to remove excess alkali and other handling and subsequent treatment of the peeled vegetables and fruit.

To reduce the thermal damage inflicted upon the products, peeling with concentrated caustic solutions of high temperatures at atmospheric pressure has been suggested. However, the results obtained thereby are not satisfactory and the hazard of handling strong caustic solutions at high temperatures is great. It has been found that, although the immersion time of the products may be greatly reduced when strong caustic solutions at high temperatures, i. e., from about 220° F. to 320° F., are employed, the disintegrating action of the caustic solutions at such high temperatures is increased to such an extent that a quick disintegration of the skin and, due to the excessive amount of solution present, a deep penetration of the lye into the tissues of the products and a disintegration of the penetrated tissues is produced. This is primarily due to the fact that upon immersion of the products into, or flooding or spraying them with, a caustic solution of high concentration and temperature the skin of the treated commodity is cracked, ruptured, destroyed, or sloughed off irregularly so that the strong lye solution, instead of being confined to action upon the skin, is brought into contact with the flesh of the fruit or vegetables and immediately attacks the tissues under the skin to a considerable depth.

Furthermore, certain fruit and vegetables are discolored in the strong disintegrating bath, their flavor is changed, and it is difficult to remove the undesirable odor imparted by the solution to the same. Careful and prolonged washing is necessary to remove the lye from the product prior to further treatment and preservation thereof.

The corrosion of the equipment under the action of the strong lye solutions of high temperatures is excessive and extreme care in carrying out the peeling process is necessary to prevent injury to the attendants by the hot solution and fumes thereof.

Since the disintegration of the skin of the treated commodities takes place in the lye bath, the same is rapidly polluted with portions of the skin and cell tissues of the vegetables or fruit so that frequent replacement of the caustic bath is necessary. Furthermore, to maintain the caustic solution at the desired temperature and to prevent further concentration thereof due to evaporation, frequent replenishment of the solution with fresh water is necessary to maintain the desired strength. This replenishment of the solution with fresh water is difficult since the water, upon addition to the hot caustic solution of temperatures from about 220° F. to 320° F., tends to flash into steam upon contact with the hot caustic bath and causes boiling due to dilution thereof.

In the method of the present invention, the action of a caustic solution and steam have been combined so as to utilize the fast disintegrating action of the caustic solution at high temperatures without producing the disadvantageous results and conditions hereinbefore explained.

It is, therefore, one object of the present invention to provide a method of peeling fruit or vegetables by combining the action of a disintegrating solution with a thermal treatment in such a manner as to effect disintegration and removal of the skin of the treated products without causing undesirable thermal damage to, or effecting other undesirable changes of, the tissues of the commodities underlying the skin thereof.

Another object is to provide a method of peeling fruit or vegetables with caustic solutions of low or high concentrations at high temperatures without effecting appreciable penetration of the caustic or heat into the tissues of the commodities or softening, distintegrating, or partial cooking thereof.

Another object is to provide a method of peeling fruit or vegetables by the combined action of a disintegrating solution and steam.

Another object is to provide a method of peeling fruit or vegetables by application of steam to the skin thereof in the presence of a disintegrating solution rendered highly effective by the heat imparted thereto upon thermal action of the steam on the skin of the vegetables or fruit.

Another object is to provide a method of peeling fruit or vegetables by applying a disintegration solution of low temperature to the skin of the products to be treated and effecting a breakdown of the skin by sudden application of steam thereto to substantially instantaneously induce a thermal and chemical disintegration of the skin of the vegetables or fruit.

Another object is to provide a method of peeling fruit or vegetables by coating the same with a caustic solution of desired concentration under conditions which will not cause undesirable thermal damage to or other undesirable changes of the tissue underlying the skin of the fruit and subsequently subjecting the coated products to steam at or above atmospheric pressure to rapidly heat the caustice coating to effect disintegration and loosening of the skin by the combined action of the caustic coating and heat, while, at the same time, gradually reducing the concentration of the caustice coating to prevent damage to the tissues underlying the skin of the commodities.

Another object is to provide a method of peeling fruit or vegetables by coating them with a caustic solution, subjecting the coated products to steam at or above atmospheric pressure and controlling the amount of caustic in the coating by varying the concentration or thickness thereof to increase or decrease the effect of the solution upon the skin of the vegetables or fruit.

Another object is to provide a method of peeling vegetables and fruit by subjecting the commodities to a combined chemical and thermal action in a pressure chamber to loosen the skin thereof and to free the skins from the commodities upon sudden discharge thereof into the atmosphere.

Further objects and advantages of the present invention will become apparent from the following description thereof.

In general, the process of the present invention comprises coating the skin of the fruit or vegetables to be treated with a caustic substance and thereupon subjecting the coated products suddenly to steam to effect a rapid heating of the caustic coating and a substantially instantaneous chemical action thereof upon the skin of the commodities to thereby disintegrate the same or to loosen the same from the underlying tissues of the vegetables or fruit.

In accordance with the method of the present invention the fruit or vegetables to be treated are first coated with an aqueous solution containing from 3% to 50% of a caustic substance such as sodium or potassium hydroxide either by dipping the products in the solution, by flooding the products therewith, or by spraying the caustic solution thereon. The preferred concentration of this caustic bath or spray varies for different fruit and vegetables depending upon the character of the skin thereof, as will be more specifically explained later on. The purpose of this caustic bath is to evenly and uniformly apply a caustic coating to the skin of the products without causing undesirable changes in, chemical action upon, or thermal damage to, the tissues underlying the skin of the commodities. To prevent such undesirable chemical or thermal action of the caustic bath on these tissues the solution is either maintained at a sufficiently low temperature, or, if a hot caustic solution is employed, the time of exposure of the commodities is held sufficiently short. Although it is desirable to maintain the temperature of the caustic bath as low as possible, i. e., from about 32° F. to about 120° F., preferably below 100° F., the method of the present invention may be efficiently practiced by using a hot caustic solution as high as 212° F. provided that the time of exposure of the products thereto is of very brief duration so as not to completely penetrate the skin thereof. For some products having a waxy skin a hot caustic solution may be desirable because a hot caustic solution emulsifies the wax of the skin and thereby prepares the skin for subsequent efficient chemical action thereon.

The time required for coating of the products in the caustic solution may be very brief, in fact for most fruit and vegetables an instantaneous dip is sufficient as long as a thorough coating of the entire skin surface with a film of the caustic solution is obtained. It is important, however, that a complete coating of the entire skin surface is obtained and an even and uniform coating is desirable. For some products which resist wetting somewhat longer exposure times to the solution may be desirable.

To obtain a complete, even, and uniform coating of the skin of the commodities to be treated, wetting agents which remain effective in the caustic solution, such as a sodium salt of a higher secondary alkyl sulfate known as "Tergitol No. 4" in the trade, may be employed.

Since the extent of the disintegrating action of the caustic solution upon the skin of the products upon application of steam thereto is dependent upon the amount of caustic substance in the coating, the necessary amount of caustic for satisfactory peeling of the various vegetables and fruit has to be supplied by the coating. This may be done either by increasing or reducing the concentration of the caustic bath or by increasing or reducing the thickness of the coating. For increasing the thickness of the caustic coating, thickening agents, such as gelatinized starch or gum karaya, may be added to the caustic solution in such amounts as will produce the desired thickness of the coating which supplies the correct amount of caustic necessary for satisfactory peeling of the particular vegetable or fruit to be treated after the product has been dipped in, flooded, or sprayed with the solution, and has been subsequently drained.

After the desired coating has been applied to the skin of the products to be treated, the coated commodities are suddenly exposed to steam at atmospheric pressure or alternatively to steam at a higher temperature and pressure. Depending upon the character of the skin and the concentration of the caustic coating, steam above atmospheric pressure may be desirable and, steam pressures up to 120 lbs. per sq. in. with corresponding temperatures up to 350° F. are in some instances employed. The time of exposure of the coated products to the thermal action of the steam varies from about 3 to 40 seconds, depending upon the character of the skin of the products treated, the concentration of the caustic solution, and the steam temperature employed.

The sudden application of the steam to the coated products effects a substantially instantaneous heating of the coating to about 212° F. to 350° F., depending upon the steam pressure employed, whereby the chemical action, i. e., the disintegrating action of the caustic solution upon the skin, is suddenly increased to such an extent that the skin is quickly disintegrated and loosened from the underlying tissue of the vegetables or fruit.

Furthermore, due to the preferable use of a cool caustic bath, the elimination of excessive amounts of caustic during the disintegration step, and the spending of the caustic in the coating by chemical reaction, as well as dilution of any remaining caustic by steam condensation on the comparatively cool surface of the products at the time of their exposure to the steam, the employee hazard, above referred to, is materially reduced and excessive corrosive effects upon the equipment are avoided.

If the commodities have been treated with steam above atmospheric pressure, as above mentioned, a subsequent pressure reduction step may be employed. The steam pressure is suddenly reduced to atmospheric or sub-atmospheric pressure, whereby a further loosening of any not disintegrated and still adhering skin portions and removal thereof is obtained due to the sudden expansion of steam pockets under the skin of the treated commodities.

Finally the treated products are subjected to water sprays and a water bath to remove all loosened or partially disintegrated skin particles therefrom, to cool the finished products, and to remove remaining caustic solution therefrom.

For carrying out the method of the present invention any appropriate apparatus may be used, such as, for instance, diagrammatically illustrated in the accompanying drawing in which:

Fig. 1 is a diagrammatic illustration of a portion of an apparatus for carrying out the present invention.

Fig. 2 is a diagrammatic view of the remainder of the apparatus shown in Fig. 1.

Fig. 3 is a diagrammatic view of a portion of a modified apparatus.

Referring now to Figures 1 and 2, 1 designates a caustic solution tank, preferably made of stainless steel or cast iron provided with an inner porcelain lining. Disposed at one end of the tank 1 is a conveyor 2 for delivering the fruit or vegetables to be treated to the tank 1 and depositing them into the same. Extending into the tank at the other end thereof is a conveyor 3 for removing the vegetables or fruit from the tank and for conveying them to and discharging them into a steam peeler 4.

The conveyor 3 may be of any conventional construction and comprises a plurality of buckets 6 preferably provided with perforated walls or made from heavy wire screen so as to permit the discharge of solution entering the same therefrom. The front portion 7 of the conveyor 3 is arranged in inclined position while the rear portion 8 thereof is preferably disposed in a horizontal plane and extends over the front end of the steam peeler 4 (Fig. 1). Inclined drip pans 11 and 12 are arranged below the upper and lower runs of the conveyor 3 as to collect and return solution dripping from the conveyor and the products carried thereby back into the tank 1.

Rotatably disposed in the tank 1 intermediate the conveyors 2 and 3 is a paddle unit 14 comprising a plurality of paddles or vanes 15 adapted to immerse the vegetables or fruit in the solution in the tank in the manner more specifically referred to later on.

The steam peeler 4 may be of any desired construction, such as, for instance, shown in the patent to Paul C. Wilbur, Patent No. 2,534,648, issued December 19, 1950, for Method of and Apparatus for Peeling Vegetables, and, for purposes of illustration, the steam peeler disclosed in the above identified application has been diagrammatically shown herein. This steam peeler comprises a treating compartment or retort 21 provided with a pressure tight rotary inlet valve 22 at the front end thereof and a pressure tight rotary discharge valve 23 at the rear end thereof. Each of these valves comprises a rotary turret 24 provided with a plurality of pockets 25 adapted to successively register with inlet and outlet openings 26 and 27, respectively, in the housing 28 of the valves.

Disposed within the treating compartment 21 is a screw conveyor 31 adapted to convey the products deposited into the retort 21 by the inlet valve 22 through the compartment 21 and to discharge the products therefrom into the discharge valve 23, which, in turn, ejects the products through the discharge opening 27 in the housing 28 thereof into the atmosphere.

Steam is supplied to the retort 21 by means of a steam pipe 32 and the admittance of the steam may be either manually or automatically controlled in any desired manner.

A pressure gauge 33 for indicating the steam pressure in the retort 21 and a pressure release valve 34 for venting the air from the retort at the commencement of operation are employed.

The turret 24 of each valve and the screw conveyor 31 are driven in timed relation by a motor 36 provided with a variable speed reduction mechanism 37 in any desired manner, such as, for instance, specifically disclosed and described in the above-mentioned Patent No. 2,534,648, previously referred to herein.

Disposed adjacent the discharge opening 27 of the discharge valve 23 is a cooling tank 38 provided with an overflow 39. Arranged below the discharge opening 27 of the valve 23 intermediate the latter and the tank 38 are a plurality of water pipes 40 (only one of which has been illustrated in Fig. 2) each provided with a nozzle 41 for discharging jets of water under pressure into the tank 38. The nozzles 41 are either disposed at or are closely spaced above the water level in the tank so as to discharge the jets of water in a substantially horizontal direction along or directly above the water level in the tank while perforated conduits 42 (only one of which is shown in Fig. 2) disposed above the tank 38 are employed for discharging sprays of water into the same.

Arranged at the rear end of the tank 38 and extending into the same is an inclined conveyor 43, the endless conveyor unit 44 of which is provided with a plurality of spaced transverse rollers in a manner well known in the art. Disposed above the conveyor 43 is a water spray system 45 and arranged below the conveyor 43 is an inclined drip pan 46 connected to the overflow 39 of the tank 38 for collecting spray water dripping from the conveyor 43 as well as fruit and vegetable peelings falling from the same and for discharging them into the overflow 39.

The conveyor 3 is driven in the direction of arrow 47 in timed relation with the inlet valve 22, screw conveyor 31, and discharge valve 23 of the peeler 4, preferably by the motor 36, through any appropriate power transmission mechanism, not shown, while the conveyor 2, paddle unit 14, and conveyor 43 are driven in the direction of arrows 48, 49, and 50, respectively, at such speed as to supply sufficient fruit or vegetables at all times to the tank 1 to utilize the fullest capacity of the conveyor 3 and steam peeler 4 and to remove the treated fruit from the cooling tank 38 at a sufficient speed to prevent piling up of the treated fruit and vegetables therein.

In carrying out the method of the present invention with steam above atmospheric pressure and with the apparatus disclosed in Figs. 1 and 2, the fruit or vegetables to be treated are delivered by the conveyor 2 in a continuous stream to the tank 1 and are dumped in the caustic solution contained therein. The paddle unit 14, which is driven in the direction of arrow 49, advances the products to be treated toward the conveyor 3 and completely submerges the products in the solution so that a complete and thorough covering of the skin surfaces of the products with the caustic solution is obtained. The time of submersion of the products in the caustic solution may be very brief as long as a complete wetting of the skin surface of the products is obtained. The caustic bath is either held at a low temperature or the time of exposure of the products is held brief enough so that no thermal damage or any undesirable disintegrating action of the caustic upon the skin of the products is obtained.

The commodities are thereupon received in the buckets 6 traveling upwardly through the caustic solution and are lifted thereby out of the same and are conveyed in separate batches toward the inlet valve 22 of the steam peeler 4. During the conveyance of the products toward the peeler 4, any surplus solution is drained from the products so that an even coating thereof is obtained. Any surplus solution, as well as solution dripping from the conveyor 3, is collected by the drip pans 11 and 12 and is returned to the tank 1.

The coated fruit or vegetables are thereupon discharged in separate batches from the buckets of the conveyor 3 at the rear end thereof into the pockets 25 of the turret 24 of the inlet valve 22 of the steam peeler 4. The conveyor 3 and the turret 24 are driven in such timed relation that each batch of products from a bucket 6 is deposited into a pocket 25 of the valve turret 24 which advances the same toward the discharge opening 27 of the valve 22. As each pocket 25 registers with the discharge opening 27 of the valve 22, the coated products are discharged into the treating compartment 21 and are advanced by the conveyor 31 therethrough and discharged therefrom into the pockets 25 of the turret 24 of the discharge valve 23 from which they are discharged upon subsequent to registration of each pocket 25 with the discharge opening 27 into the tank 38 containing a cool water bath.

Steam under pressure is constantly supplied to the treating compartment or retort 21 by means of the conduit 32 so that the retort is constantly maintained under predetermined steam pressure. Therefore, as the coated products are discharged from the pockets 25 of the valve 22 into the retort 21 they are suddenly subjected to the thermal action of the steam under pressure therein whereby the thin caustic coating of the commodities is substantially instantaneously heated to about the steam temperature and is thereby suddenly rendered highly chemically effective so that it immediately attacks the skin of the products undergoing treatment, i. e., loosens and disintegrates the same. However, this strong chemical attack of the highly heated coating is of very short duration since its action is rapidly subdued as the coating is spent upon chemical reaction with the natural acids, etc. of the treated vegetables or fruit and is diluted by condensation of steam on the cool surface of the commodities. Therefore, although, at the moment the coated commodities are subjected to the thermal action of the steam under pressure a highly efficient and rapid loosening and disintegration of the skin of the products is obtained, the chemical action of the caustic is quickly reduced so that no undesirable damage of the tissues underlying the skin, which are now completely or partially exposed, is obtained although some slight chemical action is maintained which is desirable to further loosen the skin from the tissues underlying the same. The time of exposure of the commodities to the thermal action of the steam in the retort 21 is very brief and, therefore, a retort of short length is preferred, however, the time of exposure may be varied as desired by changing the speed of operation of the conveyor screw 31 and valves 22 and 23 accordingly. Consequently, the commodities subjected to the steam are rapidly conveyed from the inlet valve 22 to the discharge valve 23 which suddenly discharges the same from the pressure in the retort 21 to atmospheric pressure.

This rapid drop in pressure, accompanied by the burst and turbulence of the discharging steam, as well as the rapid expansion of steam pockets which form under the loosened skin, or the flashing into steam of liquid pockets which have formed under the skin, blows or sloughs the loosened skin from the products.

If desired, instead of suddenly discharging the steam of the discharge valve pockets into the atmosphere, cold water may be injected through a conduit 55 into the pockets 25 of the discharge valve 23 before their registration with the discharge opening 27 to effect a rapid condensation of the steam and, consequently, a sudden pressure drop in the pockets 27. This sudden drop in pressure effects blowing or sloughing off of the loosened skin of the treated product in substantially the same manner as above described. Furthermore, by injecting sufficient amounts of cold water into the discharge valve pockets 25 even sub-atmospheric pressures and, therefore, a greater pressure drop can be obtained.

The discharging peeled commodities drop into the cool water bath in the tank 38 and are subjected to the cool water sprays emanating from the nozzles 41 and orifices of the conduit 42 whereby an effective cooling and washing of the peeled products is obtained so that diluted caustic solution still adhering to same is quickly removed and all thermal action upon the fruit is immediately arrested. The temperature of the water bath and cool water sprays may be that of the well or tap water employed, although higher or lower temperatures may be used as long as a sufficient cooling of the treated commodities is obtained. The water sprays emanating from the nozzles 41 and orifices 42 also effect condensation of the steam discharging from the discharge valve 23 and function to wash off any loose skin portions sticking to the products. The water jets discharged from the nozzles 41 also advance the peeled products toward the conveyor 43 which removes them from the cooling bath while the products are subjected to the water sprays from the system 45 which wash skin portion removed from the cooling bath by conveyor 43 down between the spaced rolls thereof onto the drip pan 46 and into the overflow 39. Likewise, the peelings floating in the cooling bath in tank 38 are directed toward and discharged into the overflow 39 under the action of the water jets from the nozzles 41.

As previously indicated, the method of the present invention may also be carried out by the utilization of steam at atmospheric pressure. Such treatment is of course more economical and may be preferable in the treatment of certain vegetables and fruit.

The treatment of caustic coated fruit and vegetables with steam at atmospheric pressure is carried out with a modified apparatus, diagrammatically illustrated in Fig. 3, comprising a steam chest 5 which is substituted for the steam peeler 4, shown in Figs. 1 and 2. The steam chest 5 comprises a hood 60, the open bottom of which is disposed above a conveyor 61 adapted to receive the coated commodities discharged from the buckets 6 of the conveyor 3, pass them beneath the hood 60 and subsequently discharge the steam treated commodities into a cooling tank 38', corresponding to the tank 38, shown in Fig. 2. Steam is constantly supplied to the interior of the hood 60 from the perforated end of a steam inlet pipe 62 which extends through and slightly below the ceiling or roof of the hood. A drip pan 63 is provided beneath the upper stretch of the conveyor 61 to receive condensed steam, and curtains may be installed at the conveyor entrance and exit ends of the hood to substantially confine the steam to the interior of the steam chest 5.

Fruit or vegetables discharged from the buckets 6 roll down an inclined chute 65 onto the rear receiving end of the conveyor 61 which is of perforated construction so as not to impede the passage of steam therethrough. The conveyor 61 may consist of an endless woven wire belt which passes over supporting pulleys 66 at its extreme ends. At a point intermediate the ends and beneath the hood, the upper stretch of the conveyor 61 passes in a reverse S curve about vertically spaced idler pulleys 67 so that the forward discharge portion of the upper stretch of the conveyor is spaced downwardly from the rear receiving portion thereof. By such an arrangement of the conveyor, the fruit or vegetables carried thereon are, subsequent to a portion of their traverse through the steam chest 5 suddenly dropped to a lower level which causes the partially disintegrated skins of the commodities to crack or rupture. In this manner, the peeling process is somewhat expedited.

As the steam treated fruit or vegetables emerge from the steam chest 5, they tumble from the end of the belt conveyor 61 into the cooling tank 38' and are washed by sprays emanating from horizontal and vertical nozzles 41' and 42' in the manner hereinabove mentioned in the description of our method employing super-atmospheric steam. The washed product is subsequently removed from the cooling tank 38' in a manner as previously described.

The strength of the caustic solution in the tank 1 is dependent upon various factors, i' e., the type and variety of the products to be treated, the chemical and physical characteristics of the skin thereof and upon the steam temperature (pressure) employed. It is important, however, that the temperature of the caustic bath and the time of exposure of the commodities thereto are maintained within such limits as to effect no undesirable thermal or chemical action of the caustic solution upon the commodities undergoing treatment prior to their exposure to the action of the steam in the retort 21 or in the steam chest 5.

For certain vegetables or fruit no wetting agent in the caustic solution is necessary, but commodities with a waxy skin require the use of the same to effect a thorough covering of the skin by the caustic solution.

Since the caustic in the coating of the products is spent during its action upon the skin of the commodities in the retort 21 or steam chest 5, the extent of the peeling action, i. e., disintegration and loosening of the skin by the steam action depends upon the amount of caustic present in the coating applied to the products in the tank 1. Consequently, to obtain the desired peeling action for the particular kind of fruit or vegetables undergoing treatment it is necessary to regulate the amount of caustic of the coating accordingly.

An increase in the amount of caustic in the coating may be obtained by increasing the strength of the caustic solution or by applying a thicker layer of caustic coating to the skins of the products. The application of a thicker film of caustic solution is obtained by adding a thickening agent such as gelatinized starch or gum karaya in such quantities to the caustic bath as necessary to obtain the desired thickness of coating which supplies the necessary amount of caustic needed during the peeling action in the retort 21.

The steam pressure and temperature, as well as the time of exposure of the coated product to the terminal action of the steam, should be such that no undesirable thermal damage is inflicted upon the commodities undergoing treatment. Furthermore, since the peeling action is due to a combined chemical and thermal treatment of the commodities therein, the steam pressure and thermal treatment period of the products is also dependent upon the concentration of the caustic solution in the tank.

For purposes of illustration specific examples for peeling tomatoes and clingstone peaches in accordance with the teachings of the method of the present invention are given herein.

In peeling tomatoes, with the use of super-atmospheric steam, the same are dipped for a brief period, i. e., 1 to 5 seconds in a caustic solution in the tank 1 of the following composition:

200 lbs. of water.
100 lbs. of sodium hydroxide flakes
1.5 lbs. of corn starch
1.5 lbs. of a wetting agent such as sodium salts of a higher alkyl sulfate known as "Tergitol No. 4"

In preparing the solution, the corn starch is first mixed with the water and, under continuous stirring, 25 lbs. of the sodium hydroxide are added and the starch is allowed to gelatinize. Thereupon, first the remainder of the sodium hydroxide and then the wetting agent are added. The heat of solution of the sodium hydroxide will cause this mixture to become quite warm and the same should, therefore, be allowed to cool before the wetting agent is added. The solution is then mixed well to assure uniformity thereof. In order to eliminate the cooling time before the addition of the wetting agent, 100 lbs. of ice may be substituted for 100 lbs. of water.

This solution is maintained at a temperature from about 32° F. to about 120° F., preferably at room temperature below 80° F. The tomatoes are dipped in this solution and are allowed to drain for a few seconds. Thereupon, the coated tomatoes are subjected to steam of 50 lbs. pressure per sq. in. in the retort 21 for 8 seconds and are then discharged to the atmosphere, i. e., tank 38, so that an instantaneous drop from 50 lbs. pressure to atmospheric pressure is obtained. Upon discharge of the tomatoes into the tank 38 they are immediately cooled by the cool water bath in this tank and are subsequently sprayed with water for the purposes as specifically explained in the above.

Likewise, satisfactory results were obtained by briefly dipping the tomatoes in a caustic solution of the following composition:

200 lbs. water
200 lbs. of sodium hydroxide flakes
2 lbs. of a wetting agent such as sodium salts of a higher alkyl sulfate known as "Tergitol No. 4"

This solution was maintained at a temperature from about 32° F. to about 120° F., preferably at room temperature, and the coated tomatoes were subjected to steam of 40 lbs. pressure per sq. in. for 16 seconds and were subsequently cooled and washed, as above described.

In peeling clingstone peaches in accordance with the teachings of the present invention the same may be coated with a 10% caustic solution of the following composition:

20 lbs. sodium hydroxide
180 lbs. water

This solution is maintained at a temperature of about 32° F. to about 120° F., preferably at room temperature and the peaches are dipped into the same for about 1 to 5 seconds and subsequently drained. The coated peaches are then subjected either to steam of 40 lbs. pressure per sq. in. for 6 seconds, or to steam of 27 lbs. per sq. in. for 10 seconds, in the retort 21. Thereupon, the peaches are discharged into the atmosphere and are cooled and sprayed with water, as previously described herein.

If desired, clingstone peaches may be coated with a hot 10% caustic solution of about 180° F., however, to prevent undesirable changes of the tissues below the skin the hot coating must be applied in a very brief period by dipping the peaches in the hot caustic solution or by flooding or spraying the same therewith for not more than 1 second. Thereupon, the peaches are subjected to steam of 40 lbs. pressure per sq. in. for 6 seconds, or to steam of 27 lbs. pressure per sq. in. for 10 seconds, and are then discharged into the atmosphere and cooled and washed, as explained in the above.

In peeling tomatoes by the use of steam at atmospheric pressure, the tomatoes are dipped for a period of 10 seconds in a caustic bath having a concentration of 18% sodium hydroxide and .3% Tergitol .08 at a temperature of 200° F. and the coated tomatoes are subsequently exposed to atmospheric steam for a period of 10 seconds. By driving the conveyors 3 and 61 at a predetermined speed, a time interval of 20 seconds between the exit of the tomatoes from the caustic bath in tank 1 and their entrance into the steam chest 5 may be provided to insure the emulsification of the waxy coating on the fruit and facilitate subsequent action of the caustic upon application of atmospheric steam to rapidly loosen and disintegrate the skins, as previously mentioned herein. Subsequently, the peeled tomatoes are cooled and washed in tank 38' preparatory to further canning operations.

While we have shown and described preferred apparatus and a preferred method for carrying out the present invention, it will be understood that both are capable of variation and modification, while still employing the principles of our invention. It is to be understood, therefore, that the scope of the invention should be limited only by the scope and proper interpretation of the claims appended hereto.

Having thus described our invention, what we claim as new and desire to protect by Letters Patent is:

1. The method of processing fruit or the like which comprises treating the fruit with a caustic solution at a predetermined temperature and concentration for a period of time insufficient to enable a solution of such concentration and temperature to begin rapid disintegrating action upon the skin of the fruit, leaving a coating of said caustic treating solution upon the unpeeled fruit, subjecting the coated unpeeled fruit to the action of steam under pressure in excess of atmospheric to thereby activate said caustic solution and produce a rapid disintegrating effect on the skin of the fruit, and subsequently cooling the fruit to arrest the chemical and thermal action thereupon.

2. The method of processing fruit or the like comprising applying a film of caustic solution of predetermined concentration to the skin of the fruit at a temperature and for a period of time insufficient to permit appreciable action of a solution of such concentration and temperature on the skin of the fruit, controlling the thickness of the film of the caustic solution by addition of a thickening agent to the caustic solution prior to its application to the skin of the fruit, subjecting the coated fruit to the action of steam under predetermined pressure above atmospheric for a predetermined period to raise the temperature of the coating to effect a rapid disintegration and loosening of the skin of the fruit, and subsequently cooling the fruit to arrest the chemical and thermal action thereupon.

3. The method of peeling fruit or the like comprising coating the skin of the fruit with a solution containing a caustic substance of predetermined concentration, a wetting agent and a thickening agent, such coating to be applied at a temperature and for a period of time insufficient to permit a solution of such concentration to disintegrate the skin of the fruit, subjecting the coated fruit to the action of steam under pressure greater than atmospheric for a period of time not over 40 seconds to activate the solution and effect a combined instantaneous chemical and thermal action upon the skin of the fruit to thereby disintegrate and loosen the same, and cooling and washing the treated fruit to remove the loose skin therefrom and to immediately arrest the chemical and thermal action thereupon to prevent any undesirable damage to the tisues underlying the skin of the fruit.

4. The method of peeling fruit or the like comprising subjecting the skin of the fruit to the action of a caustic solution of predetermined concentration and temperature for a period of time insufficient to permit appreciable action of the solution on the skin of the fruit, subjecting the fruit with caustic thereon to the action of steam under pressure greater than atmospheric to thereby raise the temperature of said caustic solution and render it effective to cause rapid disintegration and loosening of the skin of the fruit from the underlying tissues thereof, suddenly reducing the pressure acting upon the fruit to sub-atmospheric pressure to remove the loosened skin therefrom, and subsequently cooling the fruit to arrest the chemical and thermal action thereupon.

5. The method of peeling fruit or the like which comprises treating the fruit with a caustic solution of a predetermined temperature for a period of time insufficient to peel the fruit, said solution being of a concentration and consistency to form a coating over the fruit adapted thereafter to cauterize the skin of said fruit, draining excess caustic solution from the fruit while leaving said coating of caustic treating solution upon the unpeeled fruit, submitting the coated, drained, and unpeeled fruit to the action of steam under pressure in excess of atmospheric for a short period of time to produce a rapid disintegrating chemical and physical peeling effect on the skin of the fruit, and then reducing the pressure to not greater than atmospheric and the temperature to less than 212° F. upon substantial completion of skin disintegration.

6. The method of processing fruit or the like which comprises the steps of subjecting the skin of the fruit to the action of a caustic solution of predetermined concentration and temperature for a period of time sufficient to coat the skin but insufficient for a solution of said concentration and temperature to act upon and disintegrate the skin of the fruit, thereafter subjecting the coated fruit to the action of steam to heat the caustic coating to a temperature sufficient to render the coating highly effective to rapidly disintegrate and loosen the skin from the underlying tissues of the fruit, and subsequently cooling the fruit to arrest the chemical and thermal action thereupon.

7. The method of processing fruit by the use of a caustic solution which will react chemically with the skin of the fruit to cause disintegration of the skin at a speed dependent upon the concentration and the temperature of the solution, which method comprises the steps of coating of the fruit with a caustic solution of a concentration and at a temperature at which the solution causes no appreciable disintegration of the skin, thereafter subjecting the coated fruit to the action of steam to suddenly raise the temperature of the coating to a point at which the coating rapidly disintegrates the skin, and subsequently cooling the fruit to arrest the chemical and thermal action thereupon.

8. The method of processing fruit by the use of a caustic solution which will react chemically with the skin of the fruit at a speed dependent upon the concentration and the temperature of the solution, which method comprises the steps of submerging an unpeeled piece of fruit in a caustic solution of a concentration and at a temperature at which the solution causes no appreciable disintegration of the skin, removing the fruit from the solution, draining excess caustic solution from the fruit, so as to leave a coating of solution thereon, submitting the coated fruit to the action of steam to raise the temperature of the coating to a point at which the coating rapidly disintegrates the skin, and subsequently cooling the fruit to arrest the chemical and thermal action thereupon.

9. The method of peeling fruit or the like which comprises treating the fruit with a caustic solution of a predetermined temperature for a period of time insufficient to peel the fruit, said solution being of a concentration and consistency to form a coating over the fruit adapted thereafter to causterize the skin of said fruit, submitting the unpeeled fruit to the action of steam for a short period of time to produce a rapid disintegrating chemical and physical peeling effect on the skin of the fruit, and then reducing the temperature to less than 212° F. upon substantial completion of skin disintegration.

10. The method of peeling fruit or the like comprising subjecting the skin of the fruit to the action of a caustic solution of predetermined concentration and temperature for a period of time sufficient to coat the skin but insufficient for a solution of said concentration and temperature to disintegrate the skin of the fruit, moving the coated fruit through a steam atmosphere for a predetermined interval to render the coating highly effective to rapidly act on and loosen the skin from the underlying tissues of the fruit, and moving the fruit out of said steam atmosphere after said predetermined interval.

References Cited in the file of this patent

UNITED STATES PATENTS

| | | |
|---|---|---|
| 850,655 | Judge | Apr. 16, 1907 |
| 1,655,690 | Dunkley | Jan. 10, 1928 |
| 1,916,269 | Kingsbury | July 4, 1933 |